(12) United States Patent
Talon

(10) Patent No.: US 9,776,789 B2
(45) Date of Patent: Oct. 3, 2017

(54) FOOD CAPSULE WITH MULTIPLE COMPARTMENTS

(71) Applicant: NESTEC S.A., Vevey (CH)

(72) Inventor: Christian Talon, Vufflens-le-Chateau (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 14/431,368

(22) PCT Filed: Oct. 11, 2013

(86) PCT No.: PCT/EP2013/071297
§ 371 (c)(1),
(2) Date: Mar. 26, 2015

(87) PCT Pub. No.: WO2014/057094
PCT Pub. Date: Apr. 17, 2014

(65) Prior Publication Data
US 2015/0246768 A1    Sep. 3, 2015

(30) Foreign Application Priority Data
Oct. 12, 2012    (EP) .................................... 12188393

(51) Int. Cl.
*B65D 85/804*    (2006.01)
*A47J 31/40*    (2006.01)
(Continued)

(52) U.S. Cl.
CPC ............ *B65D 85/8043* (2013.01); *A23L 2/00* (2013.01); *A47J 31/002* (2013.01);
(Continued)

(58) Field of Classification Search
CPC ... B65D 85/8043; B65D 85/8046; A23L 2/00; A47J 31/407; A47J 31/46; A47J 31/40;
(Continued)

(56) References Cited

U.S. PATENT DOCUMENTS

2008/0156196 A1* 7/2008 Doglioni Majer .. A47J 31/0673
99/295
2010/0206177 A1* 8/2010 Ricotti ................ A47J 31/0673
99/295
(Continued)

FOREIGN PATENT DOCUMENTS

EP    1704803    9/2006
EP    1801034    6/2007
(Continued)

*Primary Examiner* — Michele L Jacobson
*Assistant Examiner* — Ericson M Lachica
(74) *Attorney, Agent, or Firm* — K&L Gates LLP

(57) ABSTRACT

The present invention concerns a food capsule (100, 300) comprising a cup-shaped capsule body (101, 301) enclosing a cavity (102, 302) with an opening (105, 305) at a first end (103, 303), a second end (104, 304) comprising at least one outlet (106a, 106b, 310, 311) communicating with said cavity (102, 302); an injection wall (112, 314) closing said opening (105, 305); and at least one partition (107, 306) within said cavity (102, 302) extending from said injection wall (112, 314) to said second end (104, 304) of said capsule body (101, 301) and dividing said cavity (102, 302) into a plurality of chambers (108, 109, 308, 309); characterized in that each chamber houses a quantity of an alimentary substance (110, 111, 315, 316) and communicates with at least one outlet comprising an independently-operable closure means (106a, 106b, 310, 311) in said second end (104, 304).

10 Claims, 3 Drawing Sheets

(51) Int. Cl.
  *A47J 31/46* (2006.01)
  *A23L 2/00* (2006.01)
  *A47J 31/00* (2006.01)
  *A47J 31/06* (2006.01)

(52) U.S. Cl.
  CPC ......... *A47J 31/0668* (2013.01); *A47J 31/407* (2013.01); *A47J 31/46* (2013.01); *A23V 2002/00* (2013.01)

(58) Field of Classification Search
  CPC .. A47J 31/0668; A47J 31/002; A23V 2002/00
  USPC ........................................................ 426/77
  See application file for complete search history.

(56) References Cited

U.S. PATENT DOCUMENTS

2010/0288131 A1* 11/2010 Kilber ................ B65D 85/8043
                                                      99/295
2011/0020497 A1*  1/2011 Steven .................... A23L 1/293
                                                      426/61
2012/0251668 A1* 10/2012 Wong ................ B65D 85/8043
                                                      426/77

FOREIGN PATENT DOCUMENTS

| EP | 2030915 | 3/2009 |
| EP | 2356928 | 8/2011 |
| WO | 2008046740 | 4/2008 |
| WO | 2009092628 | 7/2009 |
| WO | 2010137960 | 12/2010 |
| WO | 2011124990 | 10/2011 |

* cited by examiner

FOOD CAPSULE WITH MULTIPLE COMPARTMENTS

CROSS REFERENCE TO RELATED APPLICATIONS

The present application is a National Stage of International Application No. PCT/EP2013/071297, filed on Oct. 11, 2013, which claims priority to European Patent Application No. 12188393.8, filed on Oct. 12, 2012, the entire contents of which are being incorporated herein by reference.

FIELD OF THE INVENTION

This invention relates generally to a food capsule for use in a food preparation machine. This invention also relates to a method and a food preparation machine adapted to employ such a capsule.

BACKGROUND OF THE INVENTION

Food preparation machines are well known in the food industry and consumer goods domain. Such machines allow a consumer to prepare on command a single serving of a beverage such as brewed coffee, espresso coffee, tea, hot chocolate drink, or the like.

For purposes of clarity, the discussion of "food preparation machines" in this document should be understood as concerning such machines that prepare a portion of a substantially liquid or semi-liquid alimentary product.

Most food preparation machines for in-home use operate according to a system in which alimentary substances such as beverage ingredients are provided in individually-packaged, single-serving portions. Such portions can be soft pods, pads, or sachets, but increasingly more systems use semi-rigid or rigid portions such as rigid pods or capsules. In the following, it should be understood that the food preparation machine in question employs a rigid or semi-rigid capsule.

In many instances, the capsules for use in food preparation machines are sealed. Such sealed capsules are advantageous in that they protect their contents from the surrounding atmosphere, improving the shelf life of the capsule. Typically, such closed capsules are made from a gas and/or moisture impermeable material, and feature a rigid or semi-rigid body having one of its walls made from a flexible membrane.

The product is prepared by inserting the capsule into a food preparation machine, which preferably comprises a receptacle for accommodating said capsule and a fluid injection system for injecting a fluid (preferably water) under pressure into said capsule. In most applications, the water injected into the capsule under pressure is heated, generally to a temperature above 70° C. However, in some particular instances it may be advantageous to inject tepid or chilled water instead. The pressure inside the capsule chamber during extraction and/or dissolution of the capsule contents is typically about 1 to about 8 bar for dissolution products and about 2 to about 12 bar for extraction of roast and ground coffee.

The present invention could also encompass the so-called "brewing" process of beverage preparation—particularly for tea and coffee. Brewing involves the infusion over time of the ingredient in a fluid, most commonly hot water, whereas extraction or dissolution preparations produce a beverage within a few seconds.

For purposes of clarity, however, in this document the term "brewing" of an ingredient by a fluid is understood to encompass extraction of a powdered edible material (e.g. roast and ground powdered coffee), dissolution of edible soluble material (e.g. soluble tea, coffee, milk, or cocoa), or the infusion of an edible material in an infusion fluid under very low or atmospheric pressure, for a longer time than that required for extraction or dissolution (e.g. tea leaves in hot water).

The principle of extracting and/or dissolving the contents of a closed capsule under pressure is known and consists typically of confining the capsule in a receptacle of a machine, injecting a quantity of pressurized water into the capsule to extract or dissolve the substance, and then dispensing the resulting beverage from the capsule.

The injection is generally performed by piercing a face of the capsule with a piercing injection element, such as a fluid injection needle incorporated into the machine. Capsules applying this principle have already been described, for example in applicant's European patent no EP 1 472 156 B1, and in EP 1 784 344 B1.

In addition, machines applying this principle have already been described for example in patents CH 605 293 and EP 242 556. According to these documents, the machine comprises a receptacle for the capsule, and a perforation and injection element made in the form of a hollow needle comprising in its distal region one or more liquid injection orifices. The needle has a dual function in that it simultaneously opens the top portion of the capsule while providing an inlet channel into the capsule for the injection of the water.

The machine further comprises a supply of the fluid (usually water) that is used to prepare the beverage from the substance(s) contained in the capsule. The machine further comprises a heating unit such as a boiler or a heat exchanger, which heats the water used therein to working temperatures (usually between 80° and 90° C.). Finally, the machine comprises a pump for circulating the water from the tank to the capsule, optionally though the heating unit. The circulation of the water within the machine may be directed via a selecting valve means, such as for instance a peristaltic valve of the type described in applicant's European patent application EP 2162653 A1.

Such systems are particularly well-adapted to the preparation of coffee. One configuration for achieving this which is particularly advantageous is to provide a capsule containing roast and ground coffee powder, which is extracted with hot water injected therein.

Capsules have been developed for such an application, which are described and claimed in applicant's European patent EP 1 784 344 B1, or in European patent application EP 2 062 831.

In short, such capsules typically comprise:
- a hollow body and an injection wall which are impermeable to liquids and to air, the wall being attached to the body and adapted to be punctured by e.g. an injection needle of the machine;
- a chamber containing a bed of roast and ground coffee to be extracted;
- an aluminium membrane disposed at the bottom end of the chamber for retaining the internal pressure therein, the membrane being associated with piercing means which create drainage holes in the aluminium membrane when the internal pressure inside the chamber reaches a certain pre-determined value; and
- optionally, a deflection means configured to break up the jet of fluid, thereby reducing the speed of the jet of fluid injected into the capsule and evenly distributing the fluid across the bed of substance at a reduced speed.

During extraction, the food capsule is pierced by the fluid injection needle of the food preparation machine, usually in the aluminium membrane. The liquid is injected in the capsule compartment and the pressure within the capsule increases, facilitating the extraction of the product from the ingredients contained within the capsule.

In some implementations, the food preparation machine also pierces the capsule at a second location, for instance at its bottom, permitting the beverage to flow out during the operation of the machine. In others, the food capsule may be provided with a spout or drain, to which is generally affixed a valve or a membrane that opens when the pressure within the capsule builds up to the level required for proper beverage preparation When producing simple food products, i.e. those with only one ingredient, or that which may be prepared in a single step, the arrangements of the prior art produce satisfactory results. However, they are poorly adapted to the preparation of more complicated food products.

Specifically, presently-known food capsules require that the entire quantity of alimentary substance present in the capsule be prepared at the same time, during the injection of liquid into the capsule. While a beverage may have several ingredients, the resulting beverage must therefore be a homogeneous mixture.

For instance, many coffee beverages are based on the principles of providing the ingredients in a certain order or layering ingredients. In the food preparation systems known in the art, however, the range of possible beverages which may be produced from existing food capsules is limited.

In particular, beverages such as cappuccinos, mochas, and the like require one to layer in a cup different food components such as espresso coffee, milk, flavoured syrup, etc. To make these beverages with the food capsules known in the art, one must insert a first capsule containing a first food component, prepare that first food component, remove the first capsule, insert a second capsule containing a second food component, prepare the second food component, and so on.

This process is more complex and requires a great deal more effort to complete than the preparation of a simple beverage such as espresso coffee or hot tea. It also requires the user to purchase and store a greater number of capsules, and generates more waste for disposal than the preparation of simple beverages.

It is therefore an object of the present invention to provide a capsule which permits one to produce a beverage having multiple components from a single food capsule.

SUMMARY OF THE INVENTION

According, then, to a first aspect, the invention is directed to a food capsule, comprising a substantially cup-shaped capsule body enclosing a cavity, said capsule body comprising a first end and a second end, said first end comprising an opening communicating with said cavity and said second end comprising at least one outlet communicating with said cavity; an injection wall closing said opening of said first end of said capsule body; and at least one partition disposed within said cavity and dividing said cavity into a plurality of chambers.

According to the invention, said partition extends from said injection wall to said second end of said capsule body, each chamber housing a quantity of an alimentary substance and being in communication with at least one outlet provided in a second end, and in that each outlet comprises an independently-operable closure means.

This is advantageous in that a food capsule so configured comprises a plurality of alimentary substances, and which permits said plurality of alimentary substances to be sequentially prepared. Since the food capsule contains a plurality of chambers, each chamber may be provided with a different alimentary substance, for instance powdered milk and roast & ground coffee.

Since each chamber may be furnished with a different alimentary substance, the food components may be produced in whichever order the chambers are injected with the liquid. Whereas in capsules of the prior art all of the alimentary substances are contained in one chamber and infused or dissolved at the same time, the provision of a plurality of chambers enables one to select which of the food components are infused and/or dissolved, and in which order.

This is particularly advantageous in the preparation of complex coffee drinks such as cappuccinos, which require several such components to be provided in a particular order and layered upon each other. The food capsule of the present invention permits one to do this merely by choosing the order in which the chambers of the food capsule are injected with the liquid during the beverage preparation process. The present invention thus permits the preparation of beverages of much greater complexity than is available with the food capsules known in the art.

The provision of a food capsule with a plurality of chambers also permits one to prepare fewer than all of the alimentary substances contained within the capsule, by selectively injecting the chambers within said capsule. In this way, a single capsule may be employed to produce a variety of different beverages for differing tastes.

For example, a food capsule may be furnished comprising a first chamber containing roast and ground coffee, a second chamber containing powdered milk, a third chamber containing a sweetener, and a fourth chamber containing a flavouring (e.g. hazelnut extract). Such a capsule would permit one to prepare drinks containing any or all of the ingredients, simply by selecting which of the chambers of the food capsule are injected with liquid and which are not, and in which order. The invention therefore permits one to tailor the use of the capsules according to the desire of the user, offering improved flexibility and convenience.

The provision of different types of closure means upon the outlets of the capsule will result in a food capsule where each of the chambers may be opened under different conditions, preferably automatically as a consequence of the beverage preparation process.

Finally, the provision of the alimentary substances in separate chambers within the food capsule permits the injection parameters to be varied from chamber to chamber, such that one may optimize conditions such as liquid temperature and injection pressure according to the particular alimentary substance within each chamber.

For example, one may have a first chamber which contains an alimentary substance which is prepared by injection of a liquid at a low pressure (e.g. powdered milk), and a second chamber containing an alimentary substance prepared by injection of a liquid at high pressure (e.g. roast & ground coffee). Other parameters, such as temperature and volume, may also be adjusted depending on the particular alimentary substances being prepared and the effect sought. In this way, the versatility of the food capsule is greatly increased, while maintaining a high level of quality in the beverages that are produced from it.

Preferably, each of said closure means is configured according to one of the following:
- a membrane that is self-tearable or generally openable when the pressure inside the capsule relative to atmosphere rises above 1 bar, preferably above 3 bar, and most preferably above 5 bar;
- an assembly comprising a pierceable membrane that is sealed to the capsule body so as to close the latter, and piercing means for piercing the membrane when said piercing means and membrane contact each other, said contact being initiated by the rise of pressure within the capsule or by actuating means disposed outside of the capsule;
- a peelable membrane which is peeled manually by the user; or
- a dissolvable plug which is configured to dissolve when exposed to liquid and/or elevated temperature.

This is advantageous in that the openings disposed upon the outlets of the food capsule will all open at slightly different points in the beverage preparation process and under different conditions, depending on the choice of closure means for each opening and the particular properties and configuration of each closure means. In particular, the opening devices may be configured to open once the interior of the chamber to which it is affixed is at a particular temperature, pressure, or liquid saturation, after a certain time has elapsed after the start of the beverage preparation process, or open immediately as in the case of the peelable membrane. The food capsule is thereby configured to open each chamber automatically, and in the correct order for the ingredients contained therein.

According to a feature, said closure means of each chamber is configured to open at a respective predetermined pressure.

This is advantageous in that providing such a closure means will ensure that each chamber within the food capsule will open when the pressure within has accumulated to the proper point. In this way, the conditions under which each chamber of the food capsule is injected with liquid and each portion of alimentary substance therein prepared into a food component are optimized.

This feature is further advantageous in that the provision of the capsule-opening means within the chambers of the food capsule itself will greatly simplify the construction and operation of the food preparation machine utilized to prepare beverages therefrom.

Specifically, since each chamber of the food capsule is provided with an opening means, each of which being configured to open automatically upon reaching the desired internal pressure, the food preparation machine does not need to be provided with a capsule-opening means of its own, nor any mechanism for putting it into motion at the correct point in the beverage preparation process. The beverage preparation process is thus made simpler and more reliable at the same time it is made to produce higher-quality results.

According to another feature, said chambers are disposed concentrically within the food capsule.

This is advantageous in that it simplifies the process of locating the food capsule within the food preparation machine. Specifically, since the chambers are disposed so as to be concentric within the food capsule, one need only know the distance of a point on the surface of the food capsule from the centre of the capsule to be able to determine which chamber an injection needle will penetrate when inserted into the capsule at that point. The configuration of the food preparation machine is thereby simplified, in that the provision of the injection needles at fixed radii from the centre of a capsule receptacle will provide consistent and reliable insertion of the injection needles within the chambers of the food capsule. In this way, the construction of the food preparation machine is simplified and the use of the food capsules made easier.

According to another feature, the food capsule comprises a central chamber disposed in the centre of the cavity and a peripheral chamber disposed at the periphery of the cavity around said central chamber.

This is advantageous in that a food capsule so constructed will facilitate its positioning within a food preparation machine. A central chamber will necessarily be at the centre of the food capsule, while the peripheral chamber must be disposed at a predetermined distance away from said centre. Thus, one may configure the capsule such that the matching injection device has a first needle located at the centre of the capsule, and a second separated from the first by the predetermined distance. Such an arrangement obviates the need to determine the angular orientation of the food capsule before inserting it into the food preparation machine, since so long as its centre is aligned with the first needle, the second needle will be properly aligned as well. In this way, the food capsule is rendered simpler and easier to use.

In a preferred embodiment, the partition between the central chamber and the peripheral chamber comprises two walls disposed concentrically within said food capsule.

This is advantageous in that it permits the exact volumes of the chambers within the food capsule to be adjusted. For example, the two walls may be disposed such that the space between them is a void, thereby reducing the total volume of the two chambers without requiring the food capsule as a whole to be made smaller. This is particularly advantageous when the alimentary substances are relatively dense, thereby requiring a lower mass of said alimentary substances to prepare a serving of a beverage than for other, less dense alimentary substances. The proportion of the volumes of the two chambers may be altered in a like manner.

Furthermore, the provision of the partition as two walls permits the chambers to be shaped, by altering the shape and disposition of the walls themselves. For example, one may configure one of the chambers such that its walls are sloped. This is particularly advantageous when the alimentary substance therein is roast & ground coffee, which benefits from compaction within the food capsule. In this way, the versatility of the food capsule of the invention is improved.

According to still another aspect, the closure means of the peripheral chamber are configured to open at a first predetermined pressure and said closure means of the central chamber are configured to open at a second predetermined pressure, said first predetermined pressure being preferably higher than said second predetermined pressure.

This is advantageous in that it permits the injection of the food capsule by a food preparation machine having only a single needle. Upon the start of the injection process, the pressure within the food capsule will be approximately atmospheric; as the injection process continues, the pressure will increase. The food capsule and the food preparation machine may be configured such that one alimentary substance is prepared, and its coordinating closure means opened, when the pressure within the capsule has increased to the appropriate level, and then the other prepared when the pressure within the capsule has climbed higher still. In this way, one may realize the advantages of the food capsule of the current invention while maintaining the simplicity of operation of the single-chamber and single-needle beverage production systems of the prior art.

In a preferred embodiment, said closure means of the peripheral chamber comprises a metal foil.

This is advantageous in that a metal foil may be adapted to provide a durable, air- and moisture-tight seal, thereby preserving the integrity of the alimentary substance within the peripheral chamber. Metal foils are also generally well-suited for the safe and hygienic protection and storage of alimentary products.

Furthermore, the material properties of metal foils are generally well understood, such that a closure fabricated from metal foil may be adapted to reliably open at the first predetermined pressure.

Preferably, said central chamber houses a soluble product such as milk, and said peripheral chamber houses roast and ground coffee.

This is advantageous in that, since the predetermined pressure at which the closure means of the central chamber opens is configured to be lower than that at which the peripheral chamber opens, the food capsule is particularly well-adapted to contain a soluble alimentary substance in the central chamber and roast & ground coffee in the peripheral chamber. As roast & ground coffee requires a generally higher pressure of extraction than soluble ingredients require for dissolution, the food capsule is therefore configured to provide favourable conditions for the preparation of the alimentary substances so disposed therein.

According to another feature, said partition and said injection wall are bonded to each other with sealing means.

This is advantageous in bonding the partition and the injection wall with a sealing means will ensure that there are no gaps between the partition and the injection wall that would permit the alimentary substances provided within the capsules to flow between the chambers of the food capsule. This prevents the alimentary substances from mixing during transport and storage of the food capsules, particularly when the capsule is shaken. This ensures that the food product produced therefrom is of a uniformly high quality.

Preferably, said sealing means comprises ultrasonic sealing, heat sealing, mechanical fastening, gluing, or a combination thereof.

This is advantageous in that these sealing means will provide a strong seal between the partition and capsule body quickly, and at a minimum of expense in a manufacturing setting. Furthermore, this selection of sealing means may be performed in a way appropriate for an industrial food-packaging operation, where cleanliness and absence of foreign bodies and substances within the food capsule are of paramount importance. In this way, the economy of production of the food capsule of the invention is further improved.

According to a second aspect, the invention is directed to a method for the preparation of a beverage, comprising the steps of furnishing a food capsule as described above having a plurality of chambers each provided with a quantity of a respective alimentary substance; injecting a quantity of a liquid into each of said chambers, said quantity of liquid mixing with said quantity of a alimentary substance provided within each chamber to produce a food component; and dispensing said beverage into a container; wherein said injecting and dispensing steps are repeated for each chamber within said food capsule.

This is advantageous in that preparing a beverage according to this method permits one to realize the advantages of the food capsule according to the present invention. Particularly, the sequential preparation of the alimentary substance within each chamber means that one may produce complex beverages from a single capsule as described above, as well as layering and other aesthetically-pleasing effects in the beverage itself.

According to a feature, the injection of the quantity of fluid into each of the said chambers of the food capsule is accomplished by inserting at least one injection needle into each chamber.

This is advantageous in that by inserting at least one injection needle into each chamber, one may expedite the beverage preparation process. Specifically, when a plurality of needles is employed, one may insert all of said needles into the food capsule at once, such as when said food capsule is inserted into the food preparation machine. This obviates the need to remove, reposition, and reinsert the injection needle between the injection of liquid into one chamber and the next. The beverage preparation process is thereby rendered faster and more efficient.

According to a third feature, the invention is directed to a food preparation machine for accommodating a food capsule as described above having a plurality of chambers each provided with a quantity of a respective alimentary substance, said food preparation machine comprising a capsule holder for receiving said food capsule; at least one injection needle, said at least one injection needle being disposed such that said injection wall is pierced by said injection needle; and a liquid supply, said liquid supply being disposed in fluid communication with said at least one injection needle and further comprising a means for selectably injecting a metered quantity of liquid through any of said injection needles.

This is advantageous in that a food preparation machine so configured will permit the user to realize the advantages of the food capsule as described above. In particular, the provision of the at least one injection needle and a means for selectably injecting a metered quantity of liquid through any of said injection needles permits the user to exercise control over which chambers within the food capsule are injected with what volume of liquid and in which order. The user may thereby realize the entire range of benefits of the food capsule according to the invention.

According to a feature, the capsule holder comprises a piercing means configured to rupture a metal foil provided as a closure means of one of the plurality of chambers.

This is advantageous in that it permits the construction of the food capsules to be simplified. Specifically, the provision of a piercing means in the capsule holder eliminates the need to provide an opening means within that particular chamber itself. The food capsules need merely be provided with a surface conducive to being pierced, a metal foil being the most reliable and economical choice. In this way, the construction of the food capsules is simplified and the cost of their fabrication reduced.

According to another feature, the food preparation machine comprises a plurality of injection needles disposed such that each chamber of said food capsule is pierced by at least one of said injection needles.

This is advantageous in that it permits the food preparation machine to inject a fluid into each of the chambers of the food capsule in quick sequence, without having to withdraw and reposition any of the injection needles. The speed and efficiency of the food preparation machine is thereby improved.

According to a fourth aspect, the invention is directed towards a food preparation machine, comprising a receptacle for a food capsule, said food capsule comprising a capsule body defining a cavity, a membrane disposed on an opening of said capsule body, an annular partition dividing said capsule body into concentric chambers each provided with a quantity of a alimentary substance; a pressure ring, said pressure ring being substantially the same diameter of said annular partition, and being disposed so as to selectably press into said membrane of said capsule; and an injection needle, said injection needle comprising a pointed distal end configured to mate with an outlet disposed in a chamber of said food capsule, and being further provided with a plurality of injection holes disposed in its surface proximate to said distal end; wherein said pressure ring is configured in a first position to press said membrane into said annular partition of said food capsule and thereby block fluid communication between said partition and said membrane, and in a second position, to be retracted to re-establish the fluid communication between said concentric chambers, said pointed distal end of said injection needle mating with said outlet when said pressure ring is in a second position.

This is advantageous in that it permits the injection of a food capsule using a single needle. In particular, the configuration of the pressure ring and the needle permits a first injection step to be carried out where the needle is partially inserted into a first chamber and the pressure ring advanced to block communication between the two chambers, wherein the contents of the first chamber are dissolved under low pressure. The needle is then advanced to block the outlet of the first chamber and the pressure ring retracted to re-establish fluid communication between the two chambers. The injection holes on the side of the injection needle permit it to inject fluid at an elevated pressure while its tip blocks the outlet of the first chamber, said fluid passing through into the second chamber and extracting the alimentary substance therein.

In this way, one may utilize a single-needle injection apparatus, while still preventing leakage between the chambers of the food capsule and a high degree of accuracy in the volume of liquid injected into each chamber. The simplicity of the food preparation machine, as well as the quality of the beverages so produced, is thereby optimized.

Other particularities and advantages of the invention will also emerge from the following description.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

Figure 1:
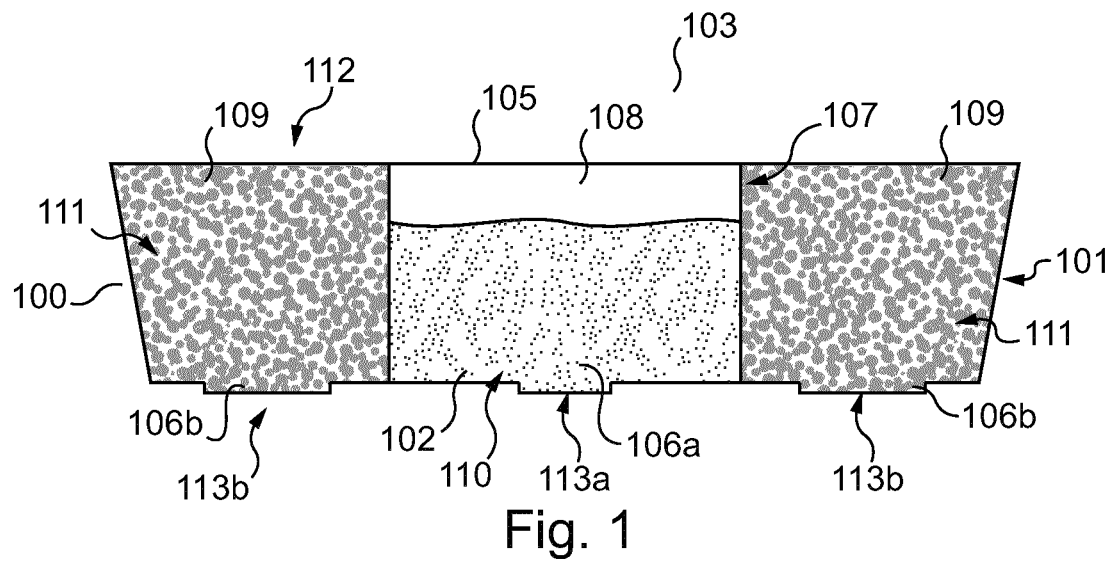
FIG. 1 is a side section view of a food capsule according to a first embodiment.

FIG. 1 depicts a side section view of a food capsule according to a first embodiment. While the following discussion deals with a food capsule for the preparation of a beverage, it should be understood that the food capsule of the invention is not limited to such. In fact, it may be adapted for the production of many different kinds of alimentary substances, for instance soups, vegetable purées, infant formula, and the like.

The food capsule 100 is comprised of a cup-shaped capsule body 101, which encloses a cavity 102. The capsule body 101 further comprises a first end 103 and a second end 104. The first end 103 comprises an opening 105, which is in communication with the cavity 102 and the second end 104. The second end 104 comprises the outlets 106a, 106b, which are also in communication with the cavity 102.

The food capsule 100 is further provided with a partition 107, which divides the cavity 102 into two chambers: a central chamber 108, and the peripheral chamber 109. In this particular embodiment, the central chamber 108 and the peripheral chamber 109 are disposed concentrically. Each of the chambers 108, 109 is in communication with at least one outlet 106a, 106b disposed in the second end 104 of the capsule body 101. Here, the capsule comprises a central outlet 106a in communication with the central chamber 108, and peripheral outlets 106b in communication with the peripheral chamber 109.

Of course, it should be understood that the number, size, shape, and disposition of the chambers within the food capsule, and the configuration of the outlets, may be adapted to the particular application in which the food capsule is to be use.

Within the chambers 108, 109 of the food capsule are provided quantities of alimentary substance: the central chamber 108 is provided a quantity of a first alimentary substance 110, while the peripheral chamber 109 is provided with a quantity of a second alimentary substance 111. The first alimentary substance 110 is preferably a soluble ingredient such as powdered milk, while the second alimentary substance 111 is generally an ingredient which is extracted under relatively high pressure, such as roast & ground coffee.

The first end 103 of the food capsule 100 is provided with an injection wall 112. The injection wall 112 is an air- and moisture-tight membrane, which is disposed over the opening 105 and sealed to the capsule body 101 and, in this embodiment, to the partition 107. The capsule body 101, partition 107, and injection wall 112 are preferably sealed to each other by ultrasonic welding, though other methods of assembling the food capsule may alternately be employed.

At the second end 104, the plurality of outlets 106a, 106b are provided with a first closure means 113a and a second closure means 113b, which serve to close the outlets and, in conjunction with the injection wall 112, seal the chambers 108, 109 of the food capsule and the alimentary substances 110, 111 within.

The closure means 113a and 113b are chosen such that the closure means used on one opening differs from that used on any other outlet of the food capsule 100. This permits the conditions under which each of the chambers is opened during the beverage preparation process to be finely tuned to the particular beverage being made, and to ensure that the alimentary substances are prepared in the desired order.

For example, in one embodiment one of the closure means may be provided as a seal which is manually torn from the food capsule by the user before use. In another embodiment, one of the closure means is provided as a dissolvable plug which dissolves when the liquid is injected into the food capsule. This might take the form of a sealing membrane which melts when exposed to the heat of the liquid injected;

or possibly a plug which dissolves into the liquid itself, such as one made from sugar or starch. In still another embodiment, the closure means is a membrane which bursts open on its own under the pressure of injection, preferably between 1 and 3 bar, and most preferably above 5 bar. In a fourth possible embodiment, the closure means is provided as a pierceable membrane, which is configured to deflect under the pressure of injection into a structure, either within the food capsule itself or disposed in the food preparation machine, that pierces the membrane and opens it.

By way of example, then, the closure means 113a may be provided as a seal which is peeled off by the user before use and the closure means 113b is a membrane which tears open when the pressure within the peripheral chamber 109 accumulates to a pre-determined level. This would provide a central chamber which is open from the beginning of the injection process, eliminating any delay in the beverage preparation process and preventing the pressure in the central chamber from accumulating to too great a level. Alternatively, one of the closure means may comprise a membrane which expands as the pressure within the chamber which it encloses accumulates, rupturing against a rupturing means disposed inside the food capsule or externally, such as in the food preparation machine itself.

The second closure means 113b is thus preferably configured so as to open when the conditions within the respective chambers 108, 109 reach a point which has been predetermined for each chamber. The first closure means 113a is preferably open at low or atmospheric pressures, such as is the case with a peelable membrane or a liquid-dissolvable plug. This is particularly conducive to a configuration where an alimentary substance 110 comprising a soluble ingredient such as powdered milk is disposed within the central chamber 108 and an alimentary substance 111 comprising roast & ground coffee is disposed within the peripheral chamber 109.

In a possible variation, one may employ an alternate means exterior to the food capsule to open the closure means. For example, the food preparation machine may be provided with a mechanical arm having a piercing means on an extremity, which is displaced so as to pierce the closure means when the capsule is inserted into the food preparation machine.

Figure 2:
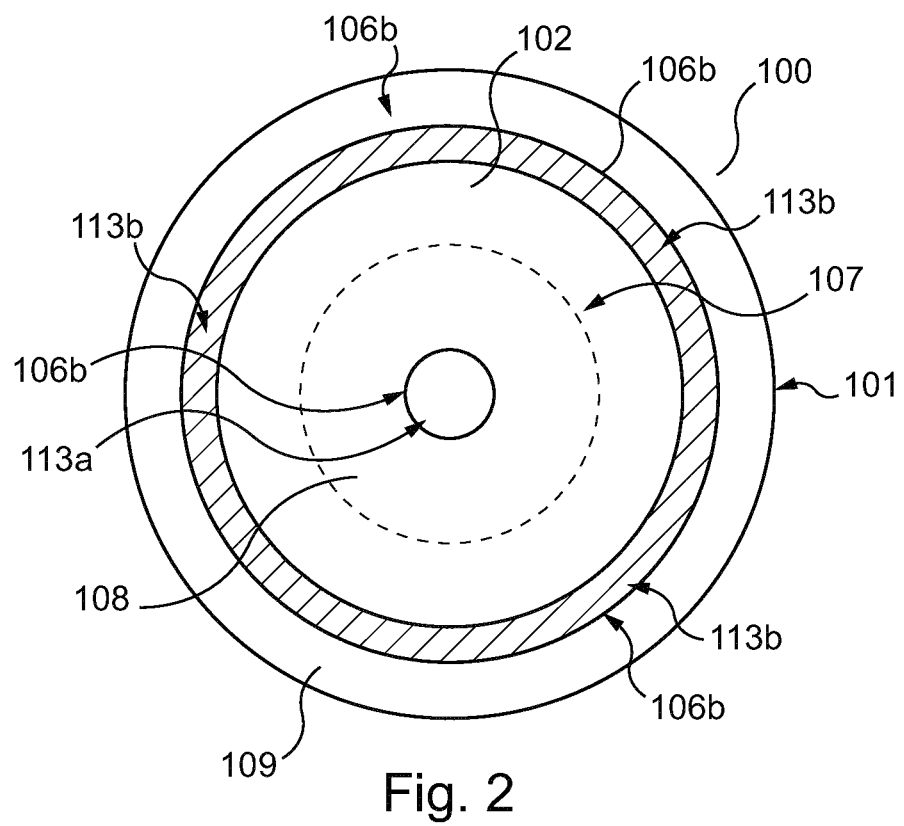
FIG. 2 is a bottom view of the food capsule of FIG. 1.

FIG. 2 depicts the food capsule 100 of FIG. 1 as viewed from the second end 104. The position of the partition 107 within the capsule body 101 is depicted; in this embodiment, the partition 107 is disposed so as to divide the cavity 102 of the food capsule 100 into two concentric chambers 108, 109.

The outlets 106a, 106b are also depicted. The central outlet 106a is simply a circular hole in the capsule body 101, while the peripheral outlets 106b are configured as segments of an annular cut-out. The exact shape, area, and disposition of the outlets may, of course, be altered as appropriate to the application.

Figure 3:
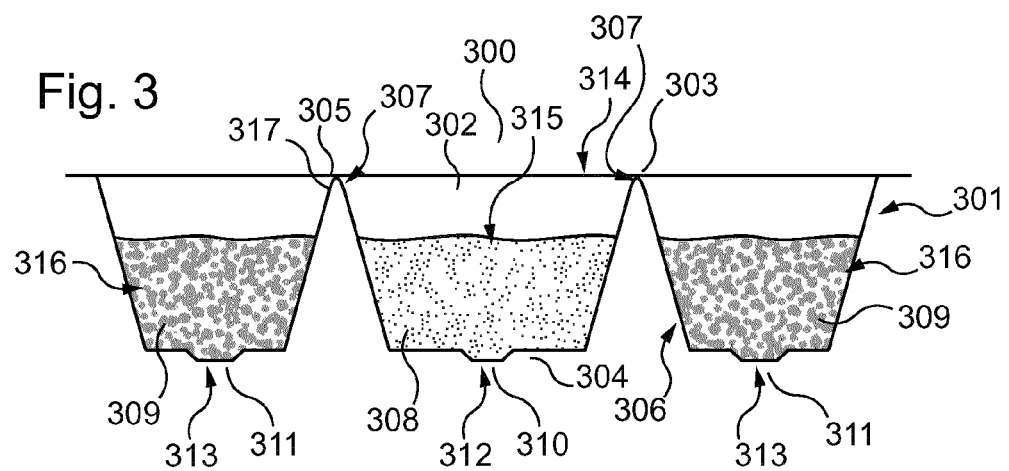
FIG. 3 is a side section view of a food capsule according to a second embodiment.

FIG. 3 depicts a side section view of a food capsule 300 according to a second embodiment. As for the food capsule depicted in FIGS. 1 and 2, the food capsule 300 is comprised of a capsule body 301 enclosing a cavity 302 and having a first end 303 and a second end 304. At the first end 303 is an opening 305, which is in communication with the cavity 302 and the second end 304.

The food capsule 300 is also provided with a partition 306, which extends from the second end 304 into the cavity 302. In the embodiment depicted, the partition 306 comprises a pair of slanted circular walls, which meet to form an sealing edge 307. The partition 306 thus divides the cavity 302 into a central chamber 308 and a peripheral chamber 309.

In an alternate embodiment, the two walls of the partition may be configured so as to provide the chambers 308, 309 in a particular form or volume, or to facilitate the provision of an alimentary substance therein.

The food capsule 300 is further provided with outlets 310, 311, which are disposed in the second end 304 so as to be in communication with the central and peripheral chambers 308, 309, respectively. The outlets 310, 311 are each provided with a second and third closure means 312, 313, which are preferably configured to open when the interior of the food capsule reaches a pre-determined pressure as in the first embodiment. Finally, the food capsule 300 is provided with an injection wall 314 over the opening 305 at the first end 303, thereby sealing the cavity 302 of the food capsule 300.

In the present embodiment, the second closure means 312 is disposed over the outlet 310 of the central chamber 308. The second closure means 312 is here configured as a thin membrane fabricated from aluminium, preferably between 20 and 50 μm in thickness. As a result, the second closure means 312 will burst open when the pressure within the central chamber 308 has risen to a certain point, generally between 1 and 3 bar.

The third closure means 313 is preferably also an aluminium membrane. The third closure means 313 is provided in a thickness sufficient to resist bursting when a pressure is applied within the peripheral chamber 309. The third closure means 313 is instead configured such that a rupturing device, disposed either inside the food capsule 300 itself, or within a capsule holder of a food preparation machine adapted to receive the food capsule 300, ruptures the third closure means 313 when the pressure within the peripheral chamber reaches the required point, preferably between 8 and 12 bar but possibly 15 bar or more.

Within each of the chambers 308, 309 are provided, as in the first embodiment, a quantity of an alimentary substance: a first alimentary substance 315 within the central chamber 308, and a second alimentary substance 316 within the peripheral chamber 309. In a preferred embodiment, the first alimentary substance 315 is a soluble ingredient such as powdered milk, and the second alimentary substance 316 is roast & ground coffee. This preferred embodiment will produce a cappuccino beverage from a single food capsule. However, other combinations of alimentary substances within the chambers 308, 309 of the food capsule 300 may be employed.

In this embodiment, the partition 306 is not bonded to the injection wall 314. Instead, the tip of the sealing edge 307 is in contact with the interior surface of the injection wall 314. This prevents mixing of ingredients contained in the two chambers 308, 309 from mixing during storage and transport of the food capsule 300, especially when shaken.

Optionally, the partition 306 and injection wall 314 may be configured such that the injection wall 314 is lightly stretched over the partition 306, augmenting the resistance to mixing provided at the sealing edge 307.

In an alternative embodiment, the interior surface of the injection wall 314 is sealed to the partition 306 along the sealing edge 307. The seal is preferably configured to be relatively weak, such that it will break when the difference in the internal fluid pressure of the chambers 308, 309 reaches a pre-determined level.

The seal is preferably configured to yield under a pressure differential of between 1 and 20 bar, more preferably between 2 and 12 bar, and most preferably between 3 and 7 bar. The exact pressure differential is, of course, chosen in view of the particular alimentary substances disposed within the food capsule, and the optimal injection parameters thereof.

The seal itself may be created by using any kind of suitable assembling technique or structure, whether chemical or mechanical. For example, the injection wall 314 may be sealed to the sealing edge 307 of the partition 306 by the use of a chemical means such as a solvent or glue, by thermal means such as ultrasonic sealing or heat sealing, or mechanical attachments such as snaps, crimps, clasps, or the like, or any combination thereof.

Figure 4A:
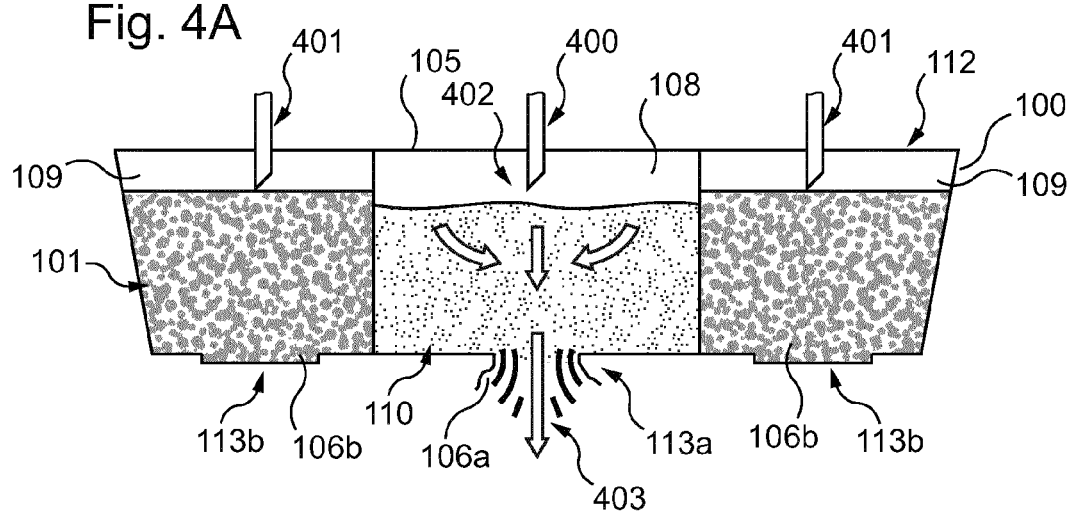
FIG. 4A is a side section view depicting a first method for preparing a beverage from a food capsule according to FIG. 1, during a first injection step.
Figure 4B:
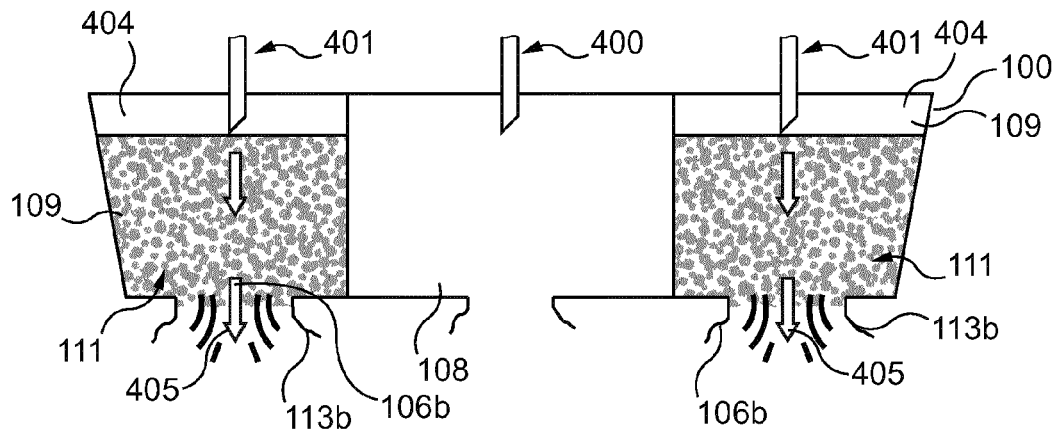
FIG. 4B is a side section view depicting a first method for preparing a beverage from a food capsule according to FIG. 1, during a second injection step.

FIGS. 4A and 4B depicts a process for preparing a beverage from the food capsule 100 of FIG. 1, during a first and second injection step, respectively.

In FIG. 4A, the food capsule 100 is furnished. The food capsule 100 has, in particular, a central chamber 108, a peripheral chamber 109, and an injection wall 112 sealing an opening 105 of a capsule body 101. The food capsule further has outlets 106a, 106b disposed in communication with the chambers 108, 109, which are closed by the first closure means 113a and the second closure means 113b. The chambers 108, 109 are, as before, provided with a quantity of an alimentary substance; in this embodiment, the first alimentary substance 109 is a soluble ingredient, and the second alimentary substance 110 is roast & ground coffee.

During the first injection step, the injection needles 400, 401 are inserted into the food capsule, piercing the injection wall 112. The injection needles 400, 401 comprise a central injection needle 400 which is inserted into the central chamber 108, and the peripheral injection needles 401 which are inserted into the peripheral chamber 109.

A quantity of liquid 402 is injected through the central injection needle 400 into the central chamber 108, wherein it dissolves the first alimentary substance 110 to create the first food component 403. As the liquid 402 is injected into the central chamber 108, the pressure therein will build to the point where the first closure means 113a, such as a foil seal, over the outlet 106a ruptures. The first food component 403 will then be free to flow from the capsule 100 through the outlet 106a, into a container for consumption.

FIG. 4B depicts the same food capsule, during a second injection step. Once the central chamber 108 is emptied of the first food component, the peripheral injection needles will inject a quantity of liquid 404 into the peripheral chamber 109. The peripheral chamber 109 contains a quantity of a second alimentary substance 111, which mixes with the liquid 404.

As the liquid 404 is injected, the pressure within the peripheral chamber 109 builds to the point that it causes the second closure means 113b upon the outlets 106b to rupture. The liquid 404 will thereby extract the alimentary substance 111 to create the second food component 405, which flows from the outlets 106b and out of the food capsule and into a container for consumption.

Preferably, the flow of liquid through each of the injection needles 400, 401 is controlled by a metering means and appropriate valves disposed within the food preparation machine. However, alternate means for controlling the timing of the injection of fluid into each chamber of a food capsule, as well as means for determining the volume injected, temperature of the liquid, and other beverage preparation parameters, may be employed according to each particular application.

Figure 5A:
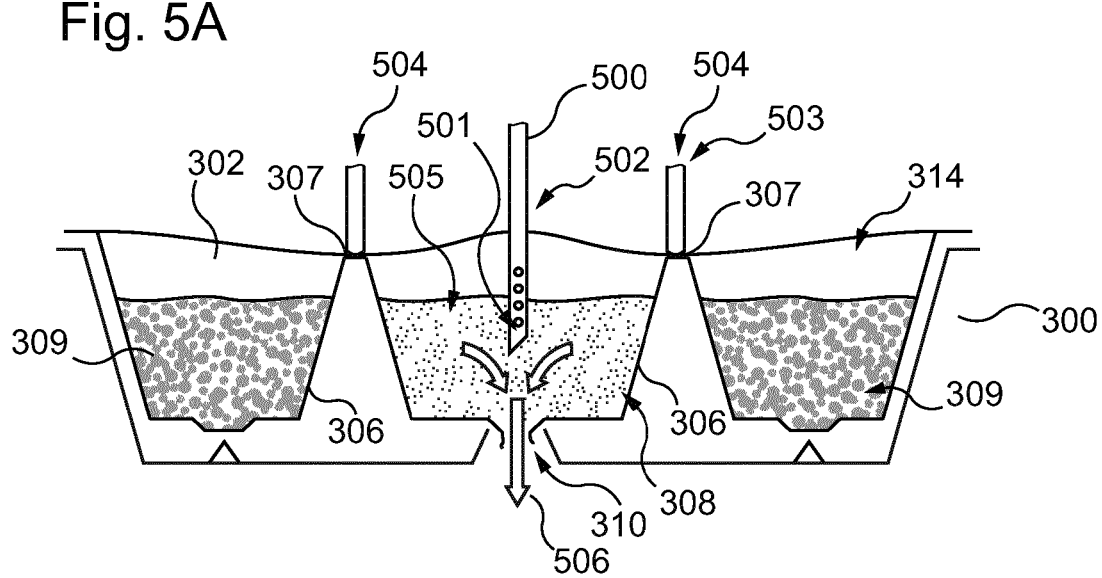
FIG. 5A is a side section view depicting a second method for preparing a beverage from a food capsule according to FIG. 3, during a first injection step.
Figure 5B:
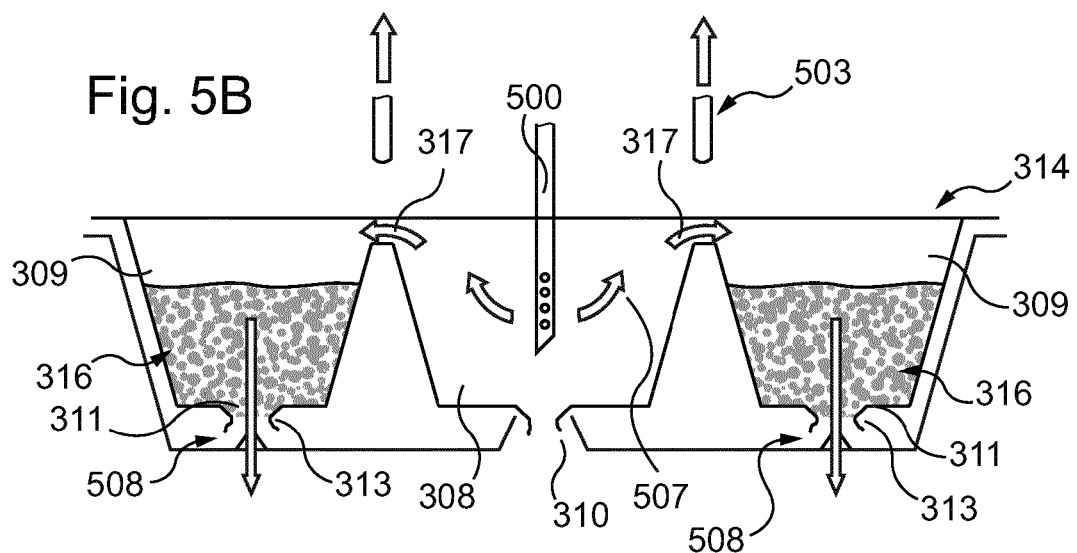
FIG. 5B is a side section view depicting a second method for preparing a beverage from a food capsule according to FIG. 3, during a second injection step.

FIGS. 5A and 5B depict a second method for preparing a beverage, from a food capsule according to FIG. 3. FIG. 5A depicts a first injection step in the method, while FIG. 5B depicts a second injection step.

In FIG. 5A, the food capsule 300 is pierced by a centrally-disposed injection needle 500. The injection needle 500 has a closed tip 501, instead being furnished with a plurality of injection holes 502 about its sides, near the tip 501.

The food preparation machine is further furnished with a pressure ring 503. The pressure ring 503 is pressed into the injection wall 314 of the food capsule 300 with pressure 504, causing it to deflect into the cavity and pressing it into the partition 306 along the sealing edge 307. This pressure creates a seal between the injection wall 314 and the partition 306, thereby preventing fluid flow between the central chamber 308 and the peripheral chamber 309.

During the first injection step, the injection needle 500 injects a first quantity of liquid 505 into the central chamber 308, mixing with the first alimentary substance 315 disposed therein. As the injection of the first quantity of liquid 505 continues, the pressure will build in the capsule, causing the second closure means 312 to open and permit flow from the outlet 310. The first quantity of liquid 505 mixed with the first alimentary substance 315 produces the first food component 506, which flows from the outlet 310 of the central chamber 308 of the food capsule 300. The injection of fluid 505 will continue until the entire quantity of first alimentary substance 315 has been made into the first food component 506.

During the second injection step, depicted in FIG. 5B, the sealing ring 503 is withdrawn from the injection wall 314 of the food capsule 300, re-establishing fluid communication between the central chamber 308 and the peripheral chamber 309.

The second injection step begins when the injection needle 500 injects a second quantity of liquid 507 into the central chamber 308 of the food capsule 300, at a higher pressure than that at which the first quantity of liquid 505 was injected during the first injection step. The second quantity of fluid 507 flows through the space 317 between the partition 306 and the injection wall 304, into the peripheral chamber 309. The second quantity of liquid 507 mixes therein with the second alimentary substance 316.

As the second injection step proceeds, the pressure within the food capsule will accumulate, causing the third closure means 313 to deflect into the piercing means 508. The piercing means 508 is disposed in the food preparation machine, a component of the capsule holder which receives the food capsules.

In a possible alternative embodiment, the injection needle 500 may be configured to mate with the interior surface of the outlet 310. In such an alternative, the injection needle 500 is advanced into the food capsule 300 at the start of the second injecting step, lodging in the outlet 310 and blocking fluid communication through it. This prevents leakage through the outlet 310 during the second injecting step.

In the embodiment depicted, the piercing means 508 is a ring of pyramidal or spike-shaped protrusions, which pierce the third closure means 313 when the pressure within the food capsule has accumulated to a sufficient point. At this point, the third closure means 313 deflects into contact with the piercing means 508 and is ruptured by it, thereby opening the outlet 311 at the bottom of the peripheral chamber 309.

As the liquid 507 flows into and through the peripheral chamber 309, it produces a second food component 509, which is conducted out of the food capsule 300 through the outlet 311.

Preferably, the second alimentary substance 316 is one which is extracted, as the higher pressure required for extraction will prevent the third closure means 313 from being ruptured prematurely during the first injection step if the seal between the partition 360 and the injection wall 314 is imperfect.

Of course, the invention is not limited to the embodiments described above and in the accompanying drawings. Modifications remain possible, particularly as to the construction of the various elements or by substitution of technical equivalents, without thereby departing from the scope of protection of the invention.

In particular, it should be understood that the possible configurations of food capsules is not limited to the examples described herein. In particular, it should be recognized that a multitude of variations incorporating differing alimentary substances, capsule configurations, capsule geometries, closure means, and other such variations are all possible.

Also, it should be understood that the configuration of the food preparation machine adapted to receive such capsules, in particular the configuration of the injection means and the means for holding and opening the food capsule, may also be varied according to the particular application in which the food capsules and food preparation machine are to be employed.

The exact configuration and operation of the invention as practiced may thus vary from the foregoing description without departing from the inventive principle described therein. Accordingly, the scope of this disclosure is intended to be exemplary rather than limiting, and the scope of this invention is defined by any claims that stem at least in part from it.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A method for preparing a food product, the method comprising:
furnishing a food capsule comprising a cup-shaped capsule body enclosing a cavity, the cup-shaped capsule body comprising a first end and a second end, the first end comprising an opening communicating with the cavity, the food capsule comprising an injection wall closing the opening of the first end of the cup-shaped capsule body, the food capsule comprising a partition disposed within the cavity and dividing the cavity into a first chamber and a second chamber, the partition extending from the injection wall to the second end of the cup-shaped capsule body, the first chamber housing a first alimentary substance and being in communication with a first outlet provided in the second end, the second chamber housing a second alimentary substance and being in communication with a second outlet provided in the second end, and each of the first outlet and the second outlet comprising an independently-operable closure member, a closure member of the first chamber is configured to open at a first predetermined pressure, a closure member of the second chamber is configured to open at a second predetermined pressure, and the second predetermined pressure is higher than the first predetermined pressure,
creating a seal between the injection wall and the partition of the first chamber and the second chamber, the seal preventing fluid communication between the first chamber and the second chamber;
injecting a first quantity of a liquid into the first chamber by inserting the at least one injection needle through the injection wall into the first chamber, the first quantity of the liquid mixing with the first alimentary substance provided within the first chamber to produce a first food component;
dispensing the first food component from the first outlet;
opening the seal and establishing fluid communication between the first chamber and the second chamber through a space between the injection wall and the partition;
injecting a second quantity of the liquid from the at least one injection needle into the first chamber, the second quantity of the liquid flowing from the first chamber through the space between the injection wall and the partition to the second chamber to mix with the second alimentary substance provided within the second chamber to produce a second food component; and
dispensing the second food component from the second outlet.

2. The method of claim 1, wherein the first chamber is a central chamber disposed in a center of the cavity, and the second chamber is a peripheral chamber disposed at a periphery of the cavity around the central chamber.

3. The method of claim 2, wherein the partition between the central chamber and the peripheral chamber comprises two walls disposed concentrically within the food capsule.

4. The method of claim 2, wherein the closure member of the peripheral chamber comprises a metal foil.

5. The method of claim 2, wherein the central chamber houses a soluble product, and the peripheral chamber houses roast and ground coffee.

6. The method of claim 5, wherein the soluble product comprises milk.

7. The method of claim 1, wherein the partition and the injection wall are bonded to each other with at least one sealing member.

8. The method of claim 7, wherein the at least one sealing member is created by a method selected from the group consisting of ultrasonic sealing, heat sealing, mechanical fastening, gluing, and combinations thereof.

9. The method of claim 1, wherein at least one of the closure member of the first chamber or the closure member of the second chamber is selected from the group consisting of a self-tearable membrane, a membrane which bursts open on its own under a certain pressure, a membrane which expands as the pressure within the corresponding chamber which the membrane encloses accumulates and ruptures against a rupturing means disposed inside the food capsule or externally, and a liquid-dissolvable plug.

10. The method of claim 1, wherein the at least one injection needle is provided by a machine that further comprises a pressure ring, the creating of the seal comprises the pressure ring deflecting the injection wall into the partition, and the opening of the seal comprises withdrawing the pressure ring from the injection wall.

* * * * *